United States Patent
Honda (10) Patent No.: US 8,416,449 B2
(45) Date of Patent: Apr. 9, 2013

(54) FORM CREATION METHOD AND PRINT CONTROL APPARATUS

(75) Inventor: Kinya Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 12/630,402

(22) Filed: Dec. 3, 2009

(65) Prior Publication Data

US 2010/0149588 A1 Jun. 17, 2010

(30) Foreign Application Priority Data

Dec. 15, 2008 (JP) ................................. 2008-318938

(51) Int. Cl.
*G06K 15/00* (2006.01)
*G06K 15/02* (2006.01)
*H04N 1/60* (2006.01)
*G06F 3/12* (2006.01)
*G06F 17/00* (2006.01)

(52) U.S. Cl. ........ 358/1.18; 358/1.15; 358/1.9; 358/1.2; 715/221; 715/222; 715/223; 715/224; 715/225

(58) Field of Classification Search .................. None
See application file for complete search history.

(56) References Cited

U.S. PATENT DOCUMENTS

| | | | | |
|---|---|---|---|---|
| 5,050,101 | A * | 9/1991 | Kiuchi et al. | 358/1.18 |
| 7,428,066 | B2 * | 9/2008 | Shinomiya et al. | 358/1.13 |
| 7,614,723 | B2 | 11/2009 | Hatayama | |
| 2005/0134917 | A1 * | 6/2005 | Nishikawa | 358/1.18 |
| 2006/0055969 | A1 * | 3/2006 | Miura | 358/1.15 |
| 2006/0290739 | A1 | 12/2006 | Hatayama | |
| 2007/0070441 | A1 * | 3/2007 | Yumita | 358/450 |
| 2008/0137136 | A1 * | 6/2008 | Shin | 358/1.15 |
| 2008/0297834 | A1 | 12/2008 | Yamaguchi | |
| 2009/0147273 | A1 * | 6/2009 | Koyano | 358/1.1 |
| 2009/0174904 | A1 * | 7/2009 | Koyano | 358/1.15 |
| 2009/0237693 | A1 * | 9/2009 | Aonuma | 358/1.9 |
| 2009/0284766 | A1 * | 11/2009 | Yajima | 358/1.9 |

FOREIGN PATENT DOCUMENTS

| | | |
|---|---|---|
| JP | 8-174951 | 7/1996 |
| JP | 2000-122837 | 4/2000 |
| JP | 2007-001118 A | 1/2007 |
| JP | 2008-250882 A | 10/2008 |
| JP | 2008-299671 A | 12/2008 |

OTHER PUBLICATIONS

Japanese Office Action dated Oct. 9, 2012, issued in counterpart Japanese Application No. 2008-318938.

* cited by examiner

*Primary Examiner* — Hilina S Kassa (74) *Attorney, Agent, or Firm* — Fitzpatrick, Cella, Harper & Scinto

(57) ABSTRACT

A print control apparatus of a printing system, which performs overlay printing using a pre-created form, lets a user designate a field in the form for data to be inserted into the field in the overlay printing. In executing overlay printing of plural pages, the data to be inserted into the designated field is analyzed to determine whether or not one same data is repetitive. In a case where it is determined that the one same data is repetitive, the form is not created, but in a case where it is determined that the one same data is not repetitive, the form including the data is created.

9 Claims, 14 Drawing Sheets

FORM CREATION METHOD AND PRINT CONTROL APPARATUS

BACKGROUND OF THE INVENTION

1. Field of the Invention

The present invention relates to an overlay print technique using a form which has been created in advance.

2. Description of the Related Art

When a large amount of forms and labels are to be printed, it is preferable that the printing speed be high. Meanwhile, since the print job is treated as an image in some type of printers, the file size of the print job becomes extremely large.

Moreover, if the size of the print job which has been generated by printing application software on a personal computer (PC) through a printer driver is large, the printing speed is reduced because the job transfer from the PC to the printer takes time.

In view of the above situation, in order to increase the printing speed, there has been a proposed technique of registering a form in advance as a form file in a printer and performing overlay printing using the form and an inserted data file. Hereinafter, the relation between the form file and inserted data file is described with reference to FIG. 1.

Figure 1:
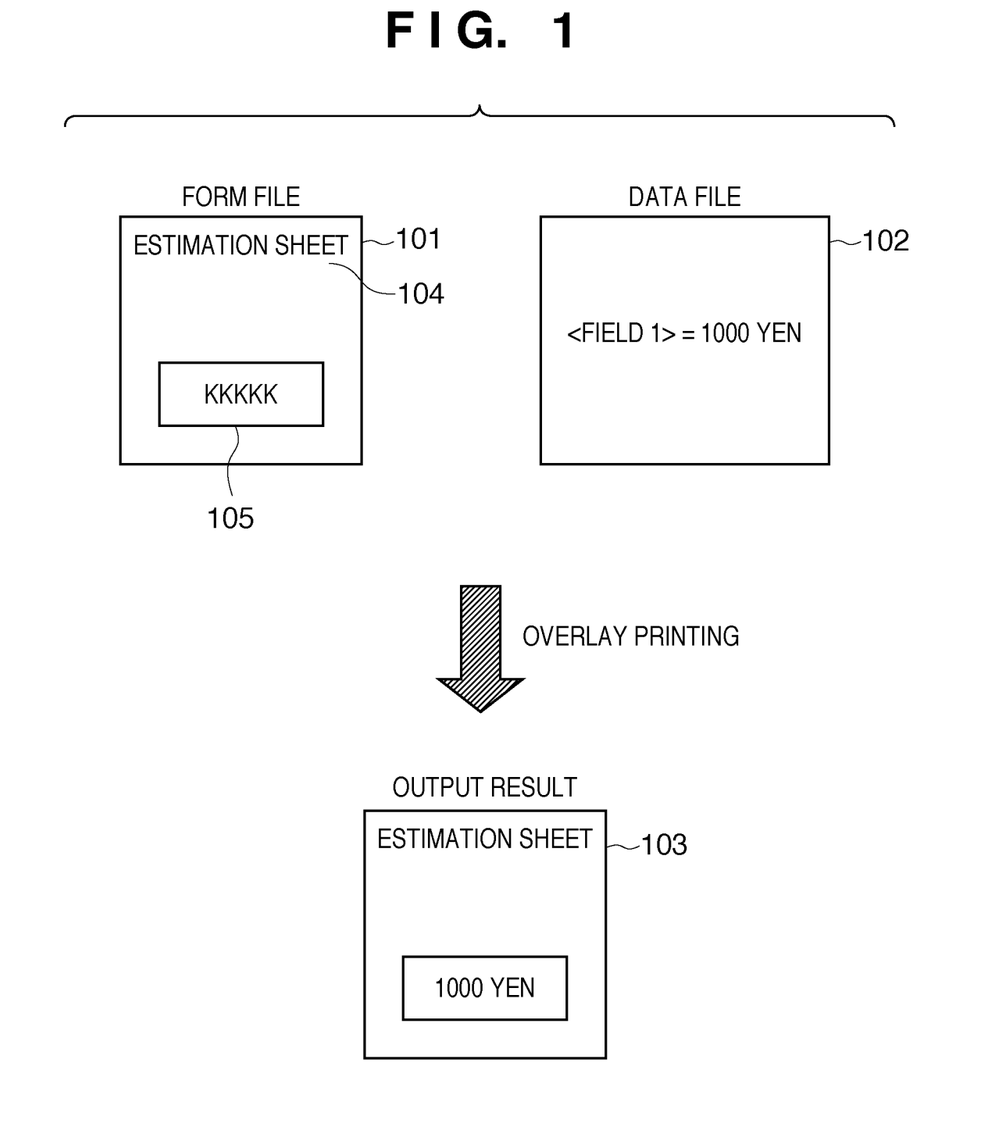
FIG. 1 is an explanatory view of a relation between a form file and a data file.

FIG. 1 shows a relation between a form file and a data file. In the form file 101, fixed texts/graphics 104 which do not depend on data, and data flow-in space 105 are defined. Herein, the data flow-in space 105 will be referred to as a field.

An inserted data file 102 is a general text file or the like in which data is described in accordance with a printing application rule. The example in FIG. 1 describes to flow the data "1000 yen" to the field defined as <field 1>.

A rendering command, after which the printing application software flows data to the field based on the form file and inserted data file, is transmitted to the printer through a printer driver, and an output result 103 is obtained as a final printout.

Figure 2:
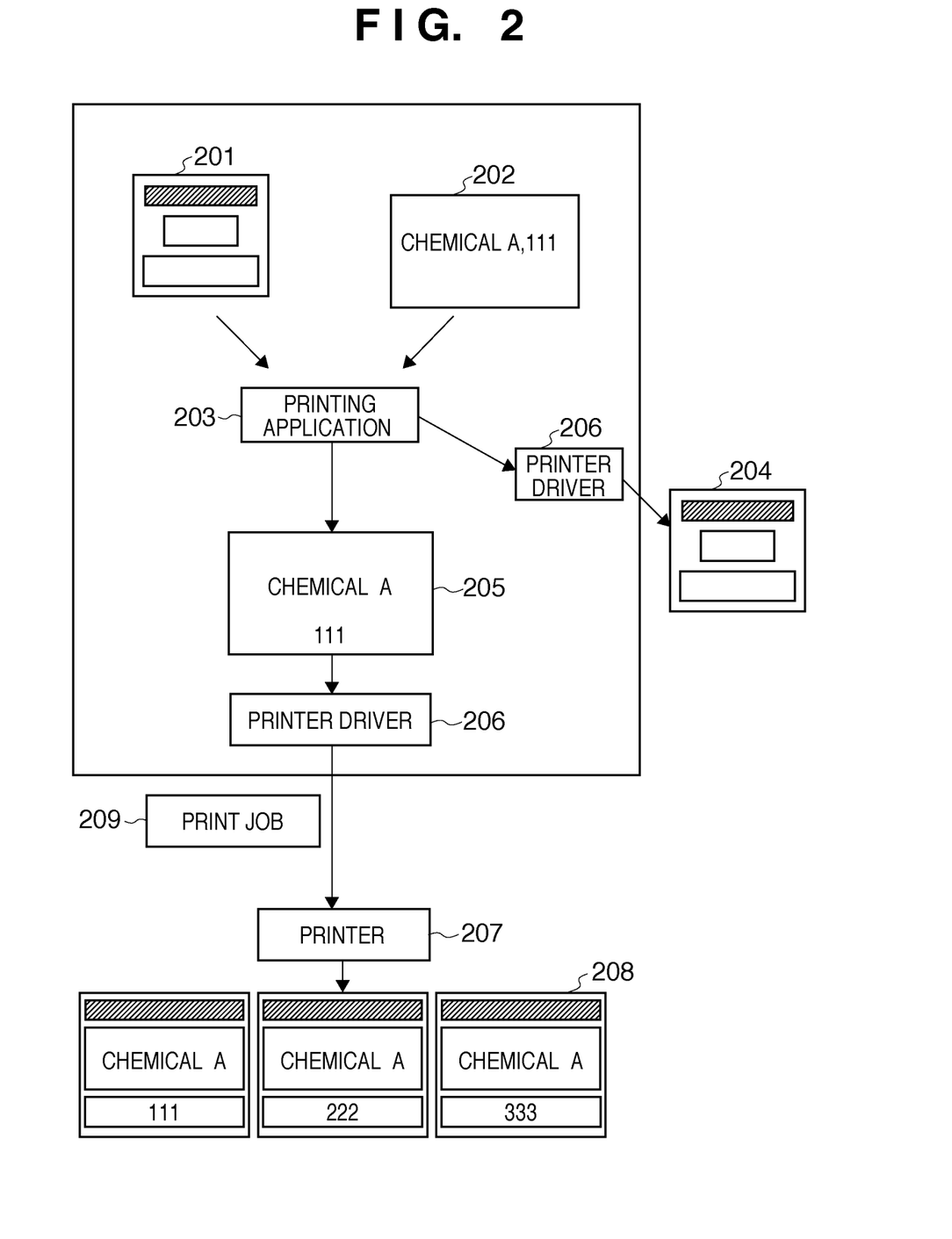
FIG. 2 is a view showing an example of overlay printing in which a form is registered in a printer.

Next described with reference to FIG. 2 is overlay printing in which a form (form file) is registered in advance in a printer.

FIG. 2 shows an example of overlay printing in which a form is registered in a printer. In the example in FIG. 2, a user instructs the printing application 203 to execute overlay printing of the form 201 and inserted data 202. According to the instruction, the printing application 203 first generates a form file 204 for overlay processing based on the form 201 and registers the form file 204 in a printer 207 through a printer driver 206.

Next, the printing application 203 analyzes the inserted data 202, and transmits rendering data 205, which includes only the data corresponding to the field in the form 201, to the printer driver 206. The printer driver 206 transmits a print job 209 to the printer 207 for rendering only the variable part that is different from the form 201 based on the rendering data 205.

By overlaying the form file 204 for overlay processing and the rendering data 205 by the printer 207, a final printout 208 can be obtained. Note that detailed processing of the printer driver 206 and printer 207 will be described later.

As described above, by virtue of performing overlay printing, the size of the print job which is transmitted from a printer driver to a printer can be made smaller than the case of not performing overlay printing. Therefore, print job transmission time from a printer driver to a printer can be reduced, and as a whole, improved printing speed can be achieved.

It should be noted that overlay printing is an existing technique. Patent applications related to overlay printing have been filed. For instance, Japanese Patent Laid-Open No. 2000-122837 proposes a technique for designating plural forms in one job at the time of overlay printing. Furthermore, Japanese Patent Laid-Open No. 8-174951 proposes a technique for reducing the size of an inserted data file in addition to an overlay print technique.

Figure 3:
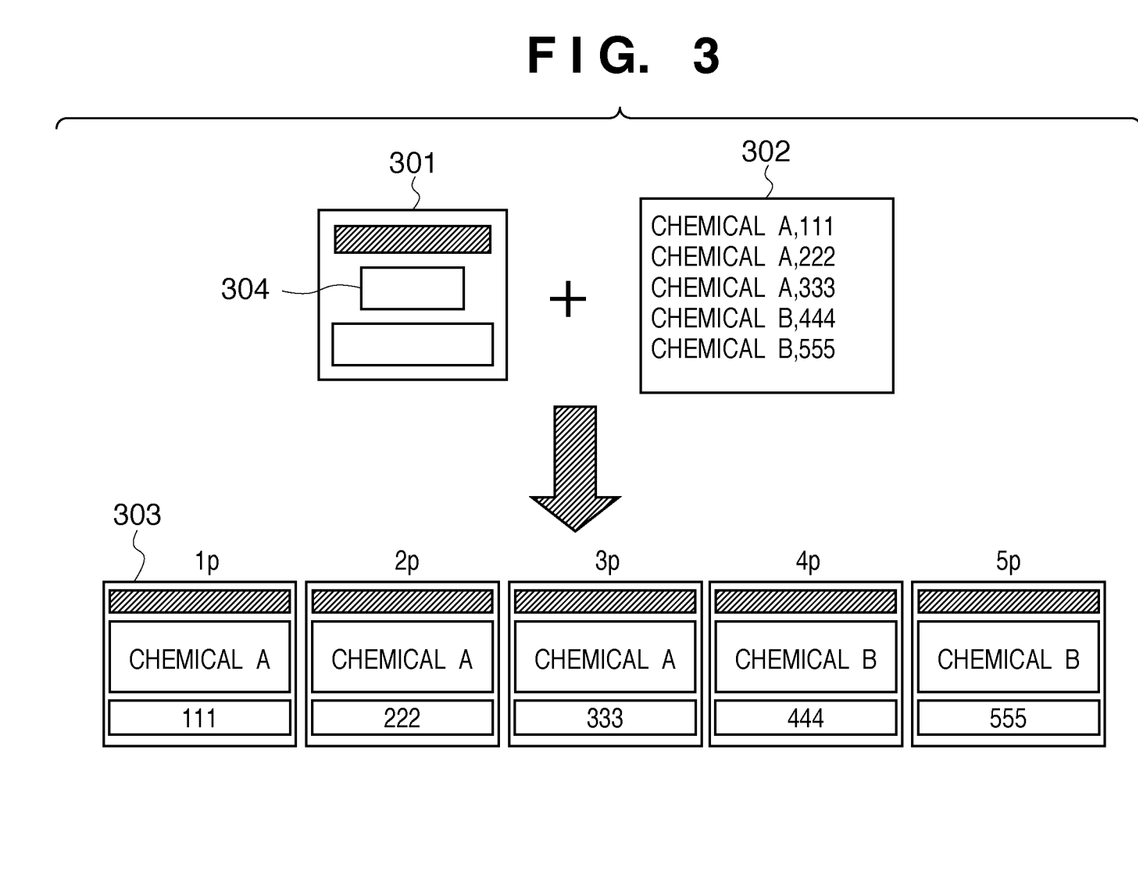
FIG. 3 is a view showing an example where a value set in a field repetitively appears for plural pages.

However, when forms, labels or the like are printed, there is a case that a value set in a particular field repetitively appears for plural pages. FIG. 3 shows an example in which a value set in a particular field repetitively appears for plural pages. In FIG. 3, five pages of printouts are shown. By performing overlay printing of a form 301 and inserted data 302, a printing result 303 can be obtained. Herein, the value set in the field 304 is a common value "chemical A" from page 1 to page 3. "Chemical B" is set in page 4 and page 5.

Figure 4:
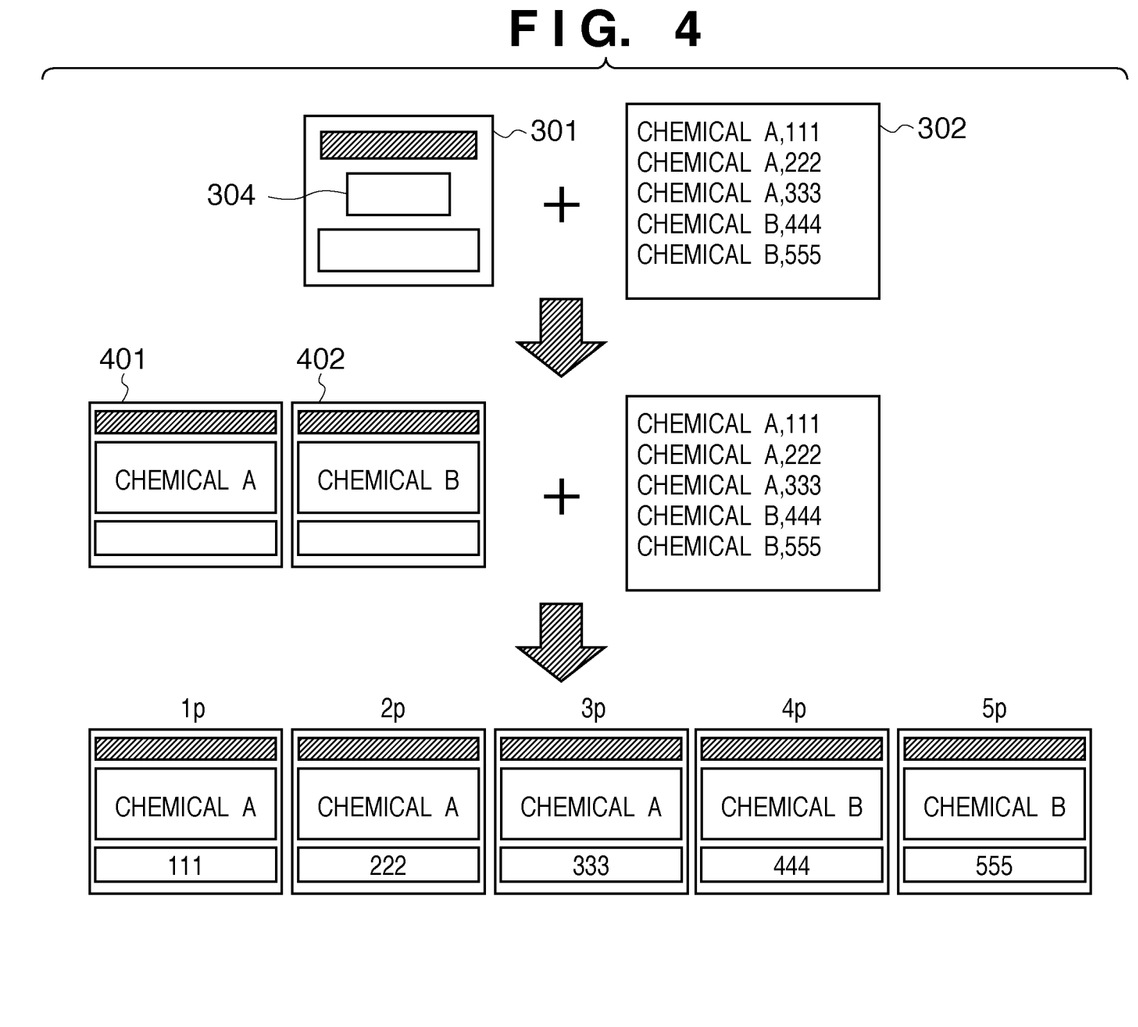
FIG. 4 is a view showing an example where the size of a print job transmitted from a driver to a printer is made smaller in overlay printing.

If the registered form for overlay printing could include not only the fixed part set in the form, but also the data which repetitively appears for plural pages, such as numerals 401 and 402 in FIG. 4, further improvement in printing speed can be expected. By including the data (chemical A, chemical B) which repetitively appears for plural pages as part of the form, the size of the print job transmitted from the driver to the printer at the time of overlay printing is made even smaller.

However, in the current technology, data that can be registered in a printer at the time of overlay printing is only the fixed part of the form. The current technology has not so far considered registering inserted data in a printer for overlay printing.

As one of the means to solve this problem, the data which repetitively appears for plural pages may be set in the form not as inserted data, but as a fixed text string, and a plurality of forms may be created and registered in advance. However in this case, some data requires a vast amount of forms, and it is difficult for a user to manage the forms. Moreover, in a case of a printer having a small memory size which cannot afford to register plural forms, a plurality of forms cannot be registered in advance.

SUMMARY OF THE INVENTION

The present invention provides a method and apparatus for improving printing performance, even in a printer having a small memory capacity, by using a larger amount of information as a target of overlay printing than that of normal overlay printing.

According to an aspect of the present invention, there is provided a form creation method in a print control apparatus which performs overlay printing using a pre-created form, comprising: designating, by a user, a field in the form for data to be inserted into the field in the overlay printing; determining whether or not one same data is repetitive by analyzing the data to be inserted into the field designated in the designating step upon executing overlay printing of plural pages; and not creating a form in a case where it is determined in the determining step that the one same data is repetitive, but creating a form including the data to be inserted into the field in a case where it is determined that the one same data is not repetitive.

According to another aspect of the present invention, there is provided a print control apparatus which performs overlay printing using a pre-created form, comprising: a designation unit that designates, by a user, a field in the form for data to be inserted into the field in the overlay printing; a determination unit that determines whether or not one same data is repetitive by analyzing the data to be inserted into the field designated by the designation unit upon executing overlay printing of plural pages; and a creation unit that does not create a form in a case where the determination unit determines that the one same data is repetitive, but creates a form including the data to be inserted into the field in a case where the determination unit determines that the one same data is not repetitive.

Further features of the present invention will become apparent from the following description of exemplary embodiments with reference to the attached drawings.

DESCRIPTION OF THE EMBODIMENTS

Preferred embodiments for realizing the present invention will now be described in detail with reference to the accompanying drawings.

Before creation processing of forms, for example, records, according to the present invention is described, a configuration of a printing system to which the present invention can be applied is described.

[System Configuration]

Figure 5:
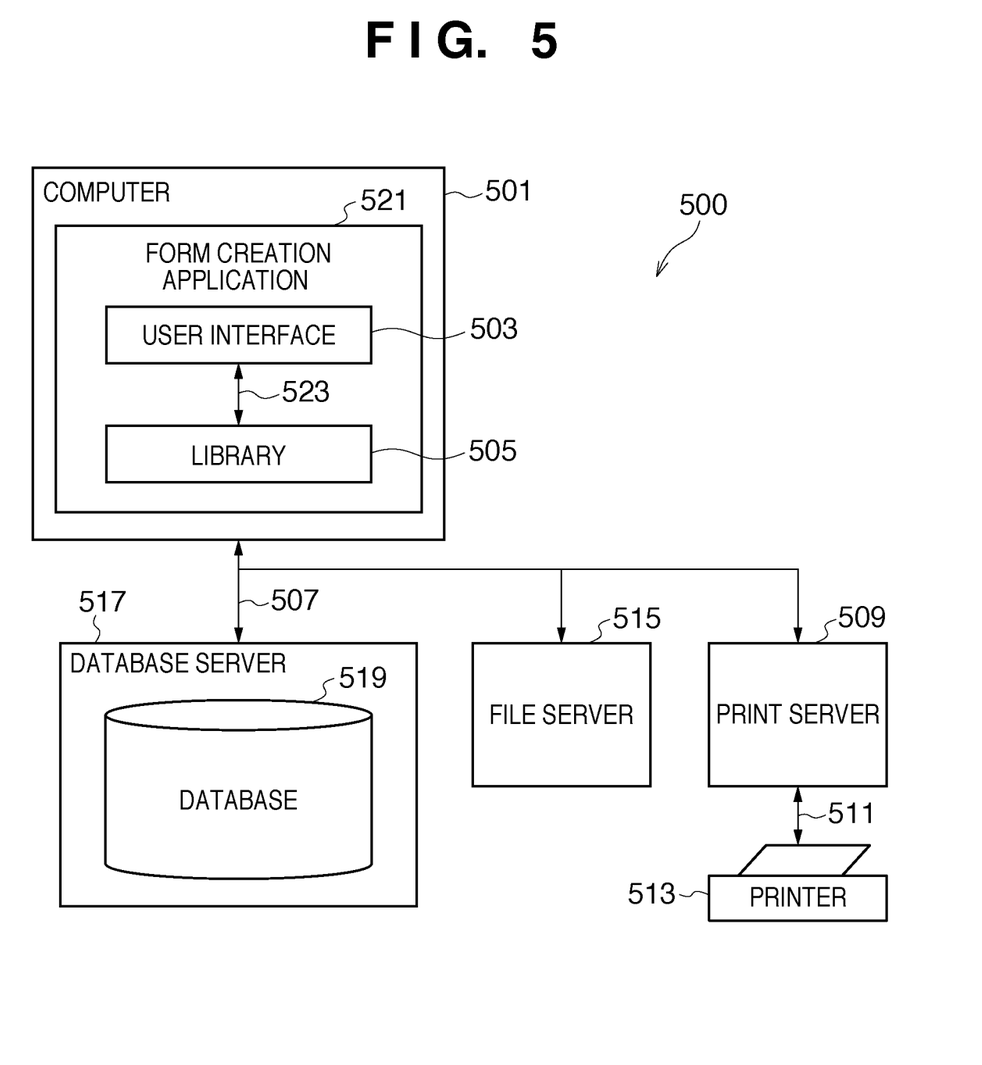
FIG. 5 is a block diagram showing a configuration of a printing system which performs overlay printing of a form such as a record.

FIG. 5 is a block diagram showing a configuration of a printing system which performs overlay printing of a form such as a record. As shown in FIG. 5, a printing system 500 comprises a general-purpose computer 501, a database server 517, a file server 515, and a print server 509. The computer 501 and the servers 517, 515 and 509 are connected through a network 507.

The database server 517 is a computer which manages a database 519, which is typical as a data source for document generation. The computer 501 and the database server 517 perform communication through the network 507.

The file server 515 is a computer where form files and setting files are stored. These files and documents may be stored in the system as a local file of the computer 501, or may directly be printed by the printer 513.

The print server 509 is a computer providing a network function for connecting the printer 513, which is not directly connected to the network, to the network 507. The print server 509 and the printer 513 are connected through a typical communication channel 511.

Herein, form creation control is executed by all or part of the software, such as form creation application 521 in the computer 501. The form creation application 521 designates execution of form creation and printing or the like, and includes two software components.

A library 505 performs form creation for overlay printing according to the present embodiment. Note that the form creation control will be described later in detail. A user interface 503 provides a mechanism for allowing a user to create forms and setting files. The user interface 503 and the library 505 perform communication through a communication channel 523.

Figure 6:
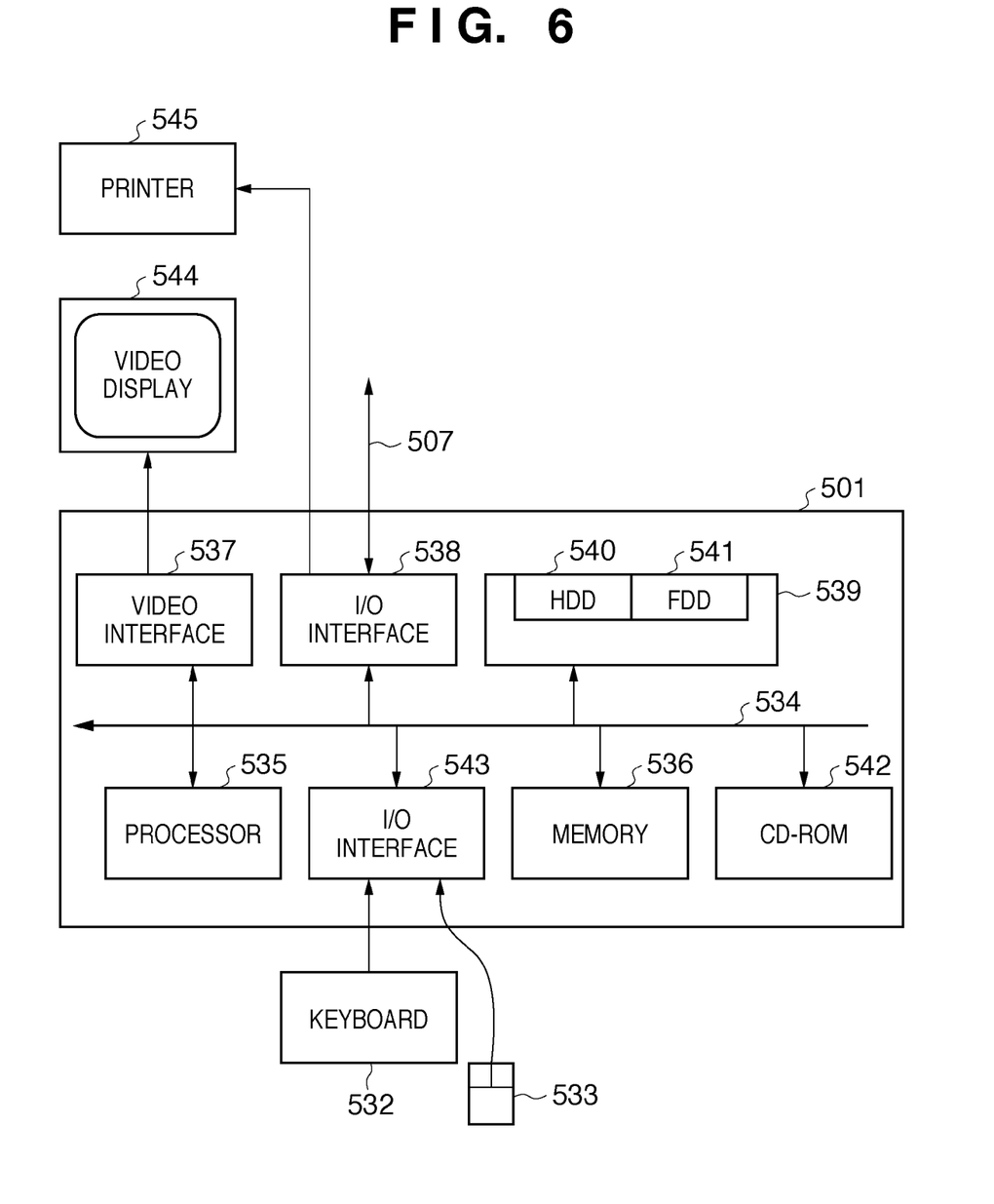
FIG. 6 is a block diagram showing a configuration of the computer 501 shown in FIG. 5.

FIG. 6 shows an example of a configuration of the computer 501 shown in FIG. 5. Note that the computer 501 serves as a print control apparatus for controlling the printer which performs overlay printing. Assume that a printer driver corresponding to the printer has been installed before the form creation application is started.

In the example shown in FIG. 6, a keyboard 532 and a mouse (pointing device) 533 are connected to the computer 501 through an I/O interface 543. The keyboard 532 and mouse 533 serve as an input apparatus. Further connected to the computer 501 are a video display 544 connected through a video interface 537, and a local printer 545 connected through an I/O interface 538. The video display 544 and printer 545 serve as an output apparatus.

Note that the aforementioned keyboard 532, mouse 533, and video display 544 serve as a user interface 503 shown in FIG. 5.

Furthermore, the computer 501 is connected, through the I/O interface 538, to other computers of the system 500 which are connected to the network 507. Note that the typical network 507 is a local area network (LAN) or a wide area network (WAN).

Also, the computer 501 typically includes at least one processor 535 and a memory 536 configured with, for example, a semiconductor random access memory (RAM), read-only memory (ROM) or the like. Moreover, the computer 501 typically includes a storage device 539, for example, a hard disk drive 540, a flexible disk drive 541 or the like. A magnetic tape drive or the like may be included although it is not shown in the drawing. A CD-ROM drive 542 is provided as a non-volatile data source.

Each of the above-described components of the computer 501 is connected through a mutual connection bus 534, and controlled by the processor 535 which executes processing based on an operating system developed in the memory 536.

The form creation application 521 shown in FIG. 5 is resident typically in the hard disk drive 540, and is read in the memory 536 when the processor 535 executes the application. In the form creation control, data in the database server 517 is acquired through the network 507 and stored in the memory 536.

Figure 7:
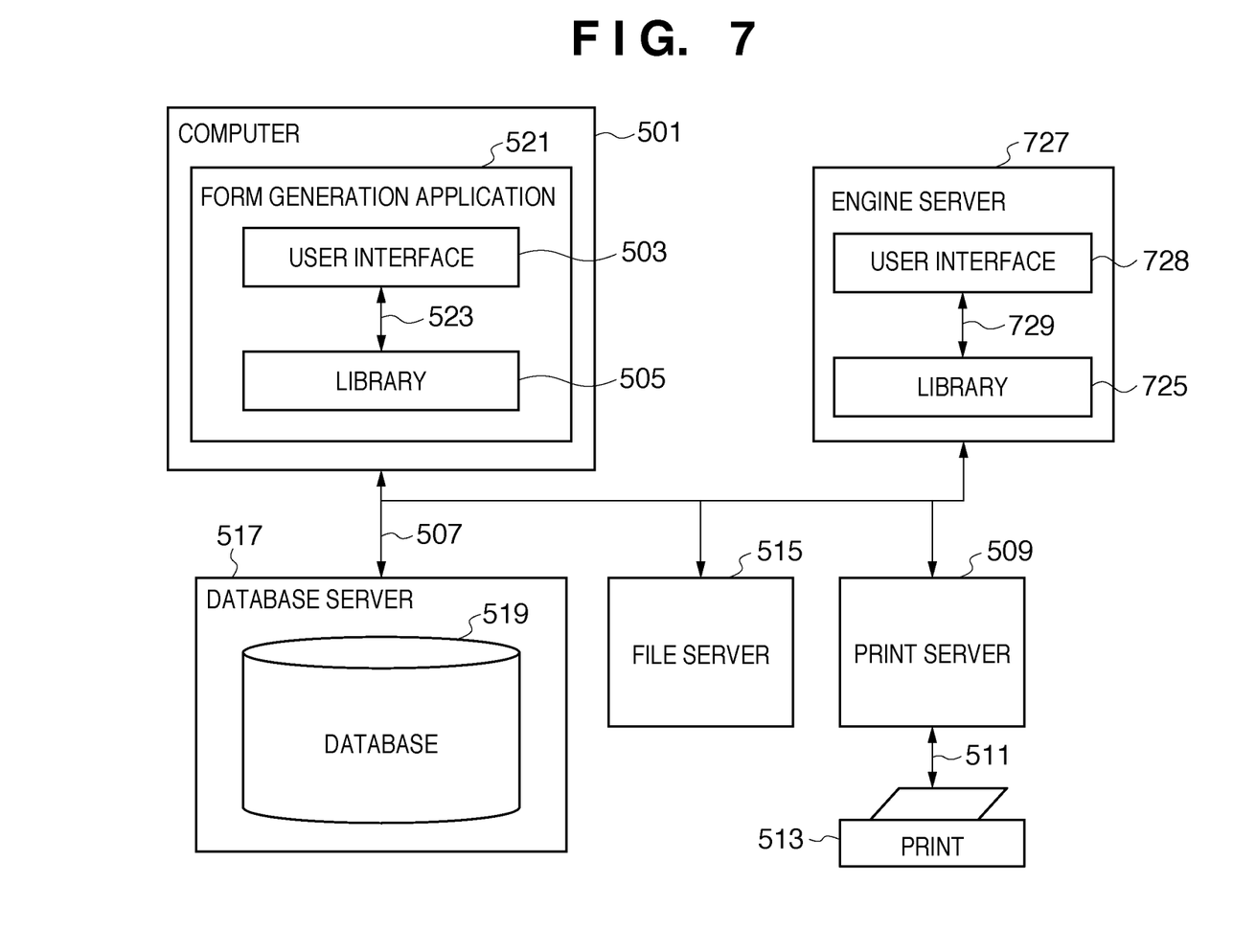
FIG. 7 is a block diagram showing a configuration of a printing system to which an engine server is added.

FIG. 7 shows an example of a configuration of a printing system to which an engine server is added. In FIG. 7, the system further comprises an engine server 727 including a library 725 which is separated from the library 505 shown in FIG. 5. Note that the engine server 727 is a typical computer.

When the file server 515 has forms for printing or other purposes, the forms can be used in overlay printing with the data which has been stored in the database 519 for document generation by the library 505. This operation is requested through the user interface 503, or performed when a user gives an instruction to the library 725 through the interface 728 in the engine server 727.

Figure 8:
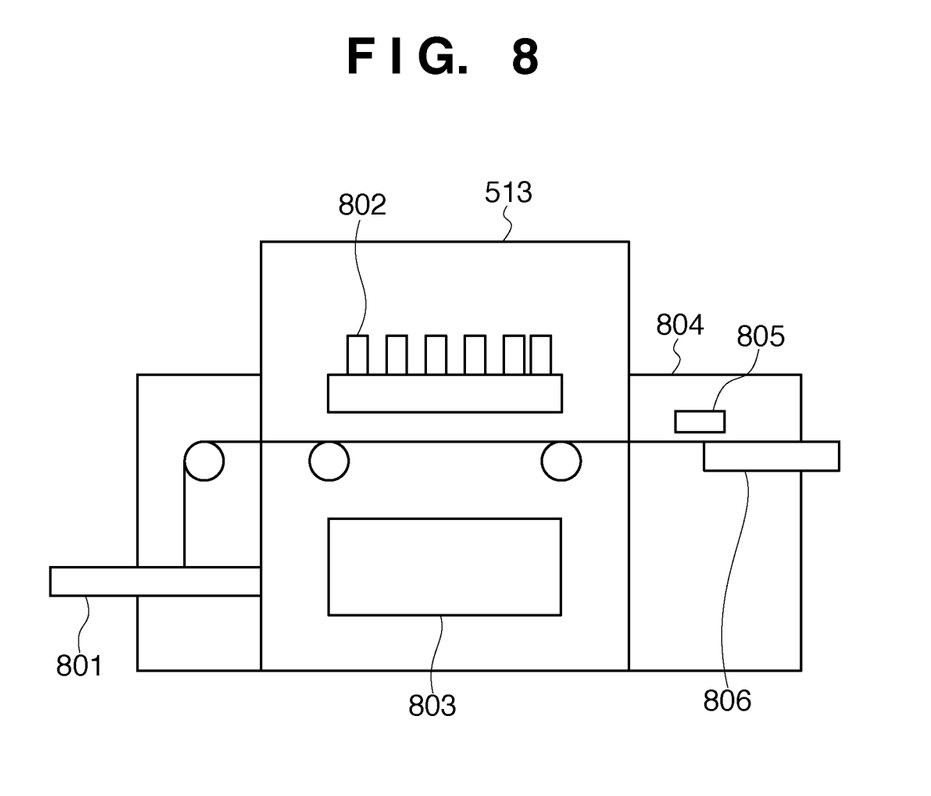
FIG. 8 is a cross-section showing a configuration of the printer 513 according to an embodiment of the present invention.

FIG. 8 is a cross-section showing a configuration of the printer 513 according to the present embodiment. A roll paper sheet set in the paper-feeding inlet 801 is drawn in upon the start of the printing and transferred inside the printer. When the paper reaches the printing position 803, ink 802 is discharged by respective printheads which are controlled based on the print data, and printing is performed on the paper. Thereafter, the printed paper is discharged to a drop tray 806 through a discharge outlet 805.

Figure 9:
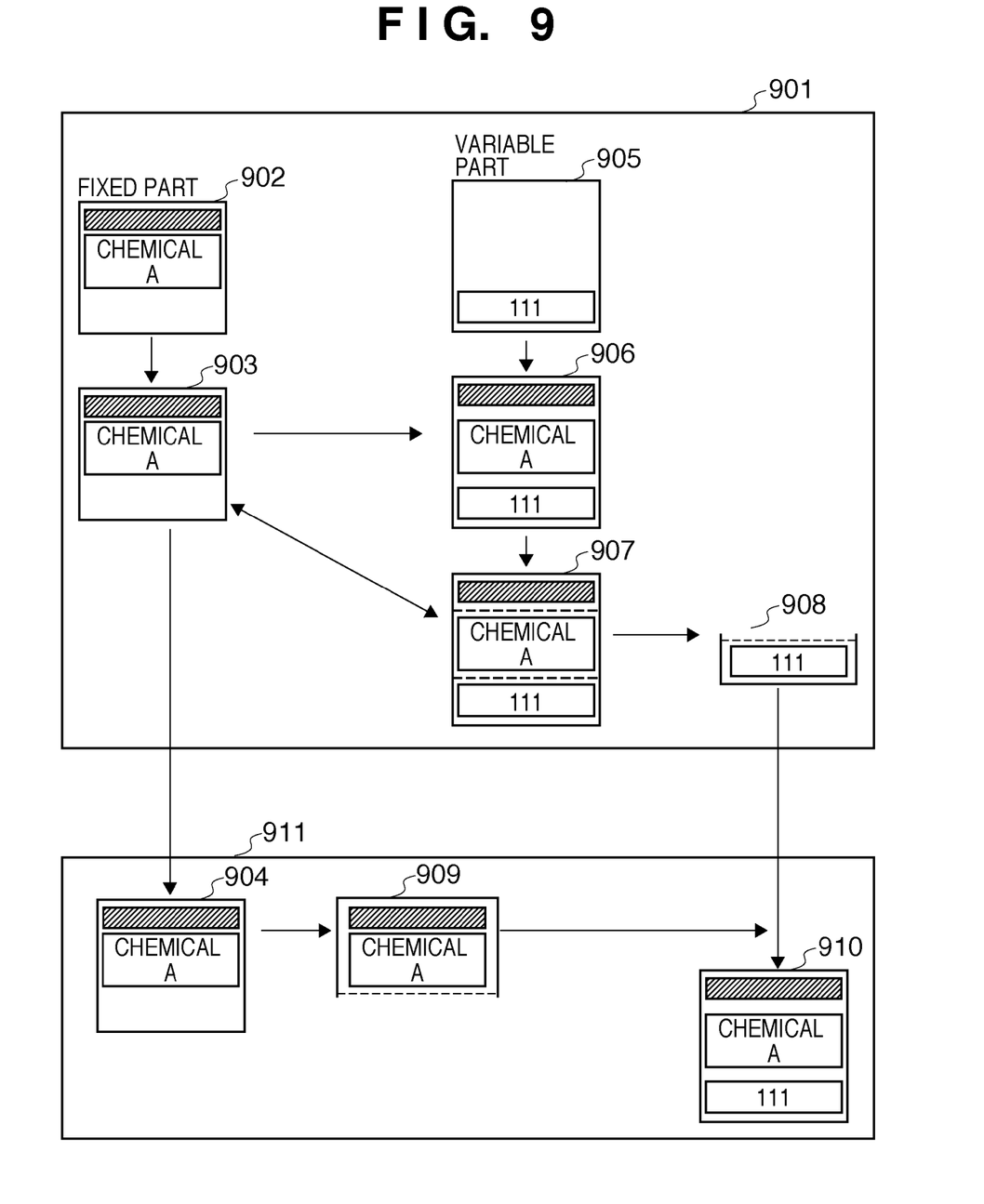
FIG. 9 is a view showing an example of internal processing of the printer driver and printer at the time of overlay printing.

FIG. 9 shows an example of internal processing of the printer driver and printer at the time of overlay printing. This is an example in which a printer driver 901 renders a form 902 and a data part 905.

When the printer driver 901 receives the form 902 from the form creation application 521, the printer driver 901 generates a form image 903 for registration in the printer, and registers the form in the printer. Numeral 904 denotes the form image registered in the printer.

Next, when the printer driver 901 receives variable data 905, the printer driver 901 generates an image 906 in which the form image 903 is overlaid with the variable data 905. The image 906 is divided in band units. The image 907 which is divided in band units is compared with the form image 903 in units of the band. As a result of comparison, the image 908 which is the part different from the form image 903 is transmitted to the printer 911.

Meanwhile, the printer 911 receives the image 908 from the printer driver 901, and based on the registered image 904, generates an image 909 which is to be overlaid with the image 908. The printer 911 overlays the generated image 909 with the received image 908 and performs printing, thereby obtaining a final printout 910.

By transmitting only the image of the variable data in the above-described manner, the data transfer amount from the printer driver to the printer can be reduced.

[Form Creation]

Herein, form creation control executed by the form creation application 521 is described with reference to FIGS. 10 to 13. This control is performed for dynamically creating an overlay form by the library 505, when overlay printing of a form and inserted data is to be executed. Hereinafter, the form including dynamically generated inserted data will be referred to as a "dynamic overlay form."

Figure 10:
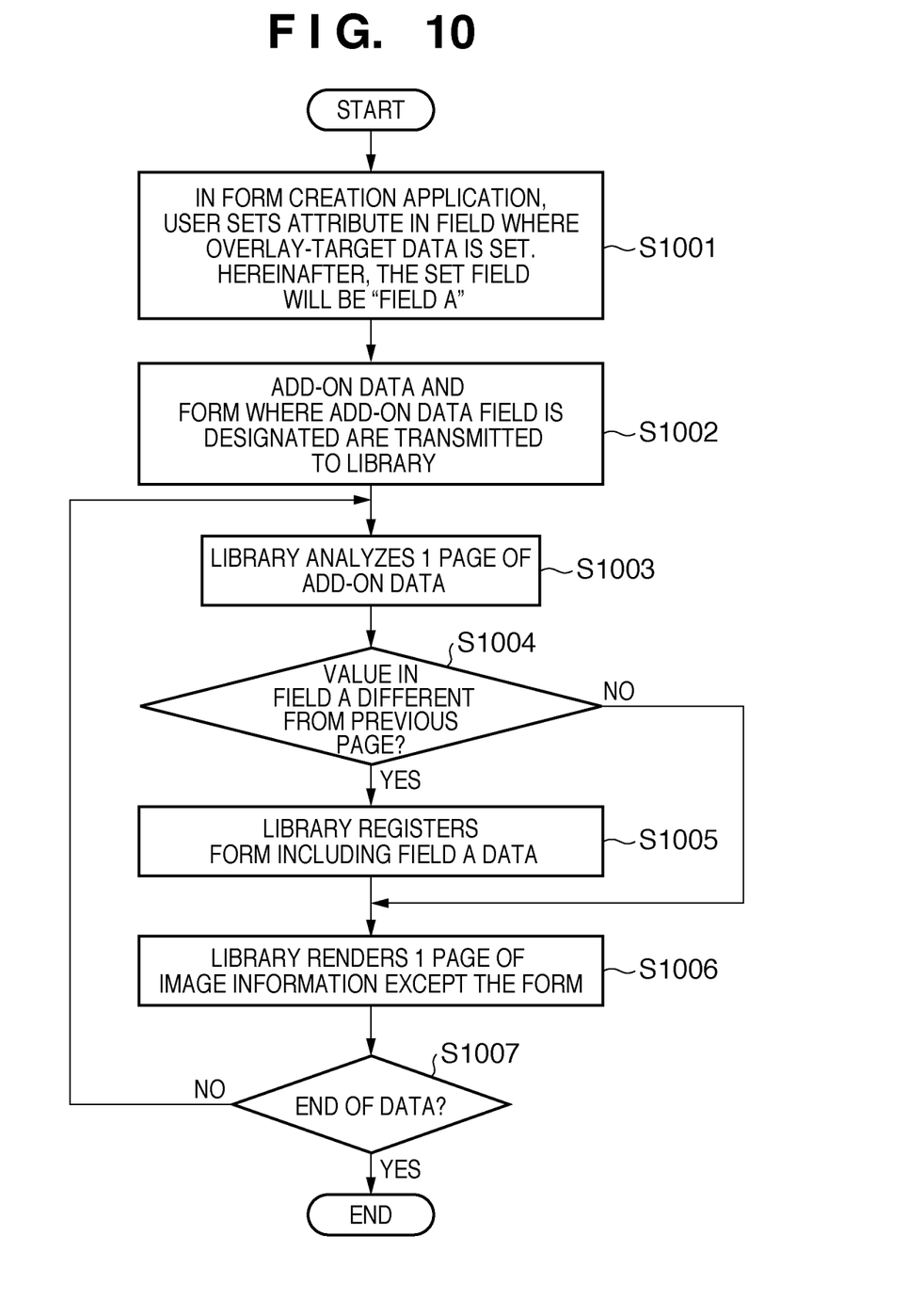
FIG. 10 is a flowchart describing form creation control according to an embodiment of the present invention.

FIG. 10 is a flowchart describing the form creation control according to the present embodiment. In step S1001, when a user creates a form using the form creation application 521, an attribute is set in an inserted data field which is to be included as part of the form registered in the printer.

Note that it is effective if the setting is performed on the field having data which repetitively appears for a predetermined number of pages in overlay printing.

Figure 11:
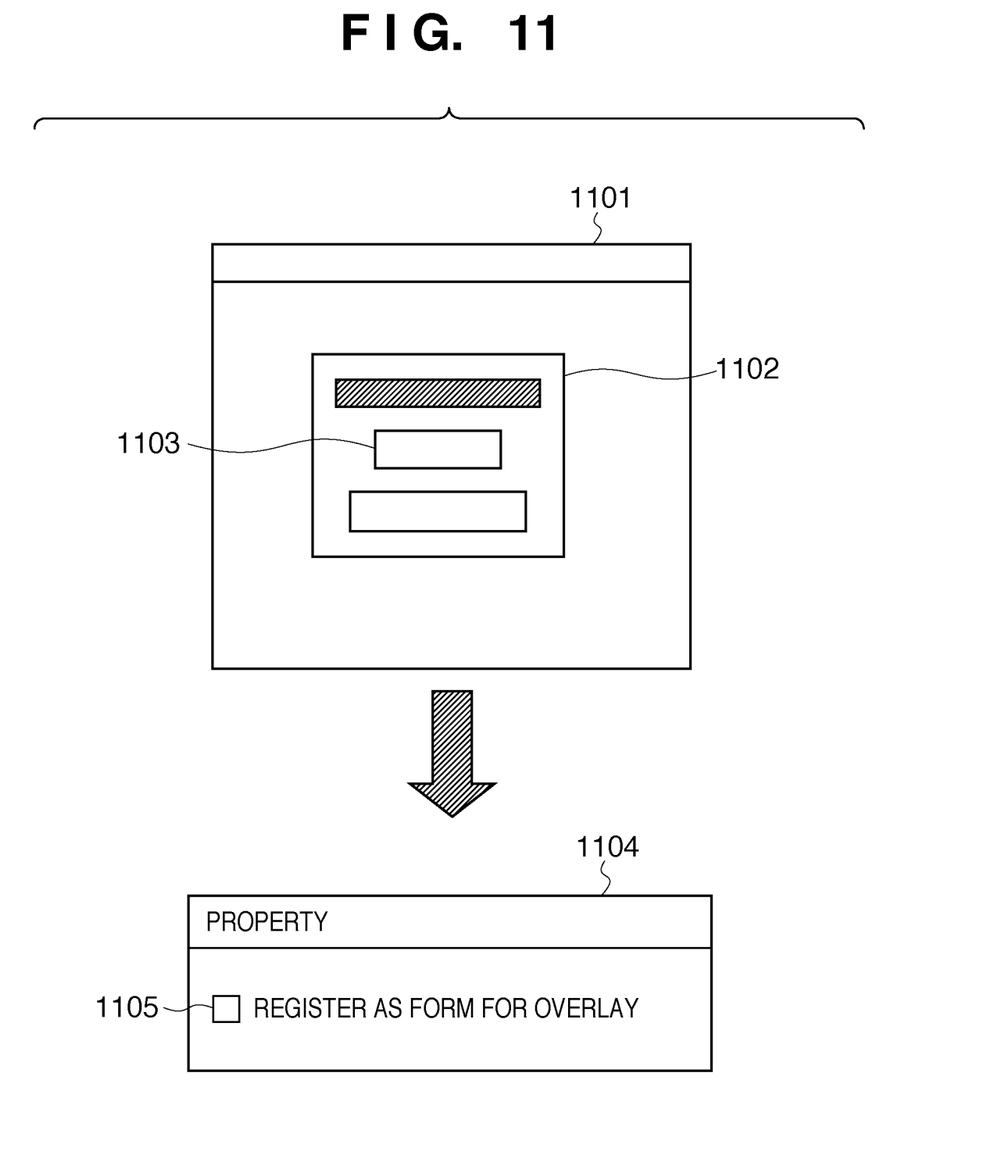
FIG. 11 is an explanatory view of a method for setting an attribute in a field according to an embodiment of the present invention.

FIG. 11 is an explanatory view of a method for setting an attribute in the field according to the present embodiment. Numeral 1101 denotes a form creation editor screen which is provided by the form creation application 521. Numeral 1102 denotes a form displayed on the editor screen 1101. Note that the form 1102 is designated by a user when the editor is started.

The user designates a field 1103 by selecting the field with a mouse or the like to open the property of the field 1103. When the form creation application 521 detects the designation, the application 521 displays a pop-up property dialogue 1104 of the field 1103 on the editor screen 1101. The user ticks the check box 1105 of the property dialogue 1104, thereby setting the field for setting inserted data.

Next, in step S1002, inserted data and the form where the inserted data field is designated in step S1001 are transmitted to the library 505.

Figure 12:
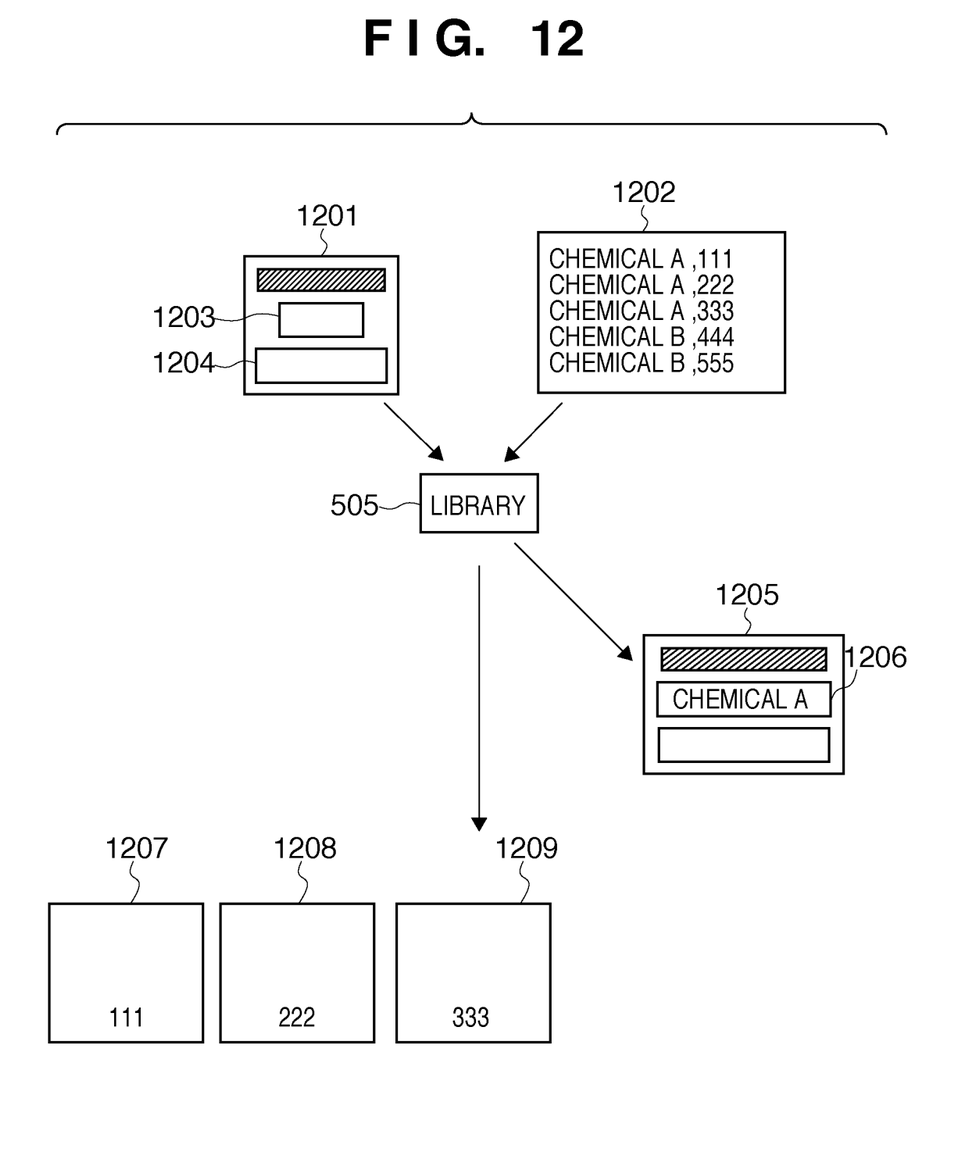
FIG. 12 is a view showing an example of form creation by a library according to an embodiment of the present invention.
Figure 13:
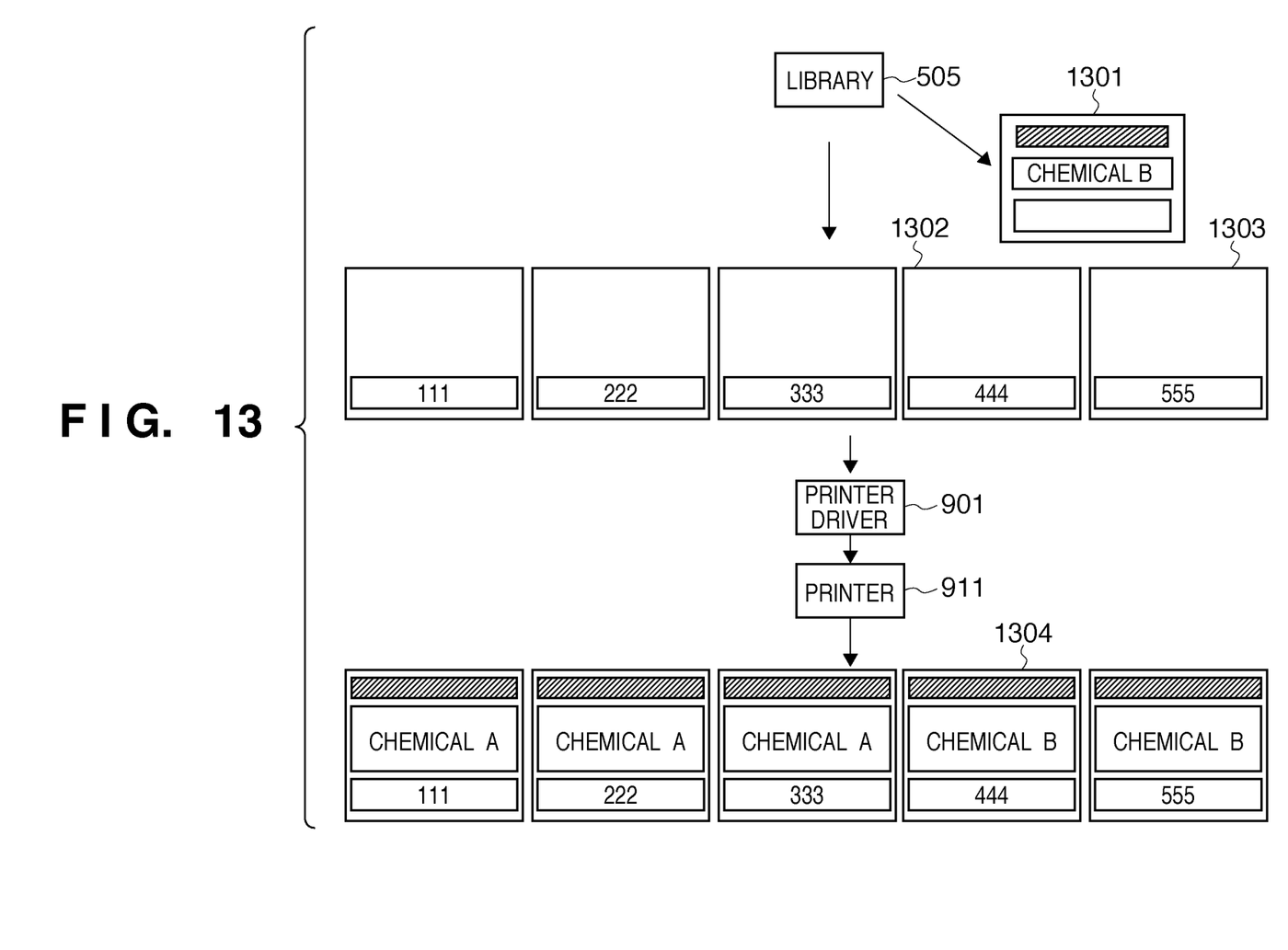
FIG. 13 is a view showing an example of form creation by a library according to an embodiment of the present invention.

FIGS. 12 and 13 show an example of form creation by the library according to the present embodiment. In FIG. 12, numeral 1201 denotes a form, in which fields 1203 and 1204 for setting inserted data are designated. Numeral 1202 denotes an inserted data file. Herein set in the field 1203 is the first-column data (chemical A, chemical B) of the inserted data file 1202. Set in the field 1204 is the second-column data of the inserted data file 1202. Also assume that, in the field 1203, an attribute indicating to include the inserted data in the form registered in the printer is set.

In step S1003, the library 505 reads one page of data from the inserted data file 1202 and performs analysis. More specifically, the first-row data and second-row data of the inserted data file 1202 are analyzed.

In step S1004, the library 505 determines whether or not the data set in the field 1203 is different from the value in the previous page. As a result of determination, if it is determined that the values are the same, the control proceeds to step S1006; however, if it is determined that the values are different, the control proceeds to step S1005. In step S1005, the library 505 creates a dynamic overlay form 1205 including the data which has been analyzed in step S1003 in the field 1203, and registers the form in the printer. By this processing, inserted data "chemical A" is set in the part 1206 of the dynamic overlay form 1205, which corresponds to the field 1203 of the form 1201.

In step S1006, the library 505 renders one page of information except the form part created in step S1005. Herein, only the variable part other than the part registered as a form is rendered. Numerals 1207, 1208 and 1209 in FIG. 12 respectively denote the first, second, and third pages on which inserted data is rendered.

In step S1007, the library 505 determines whether or not all of the inserted data have been analyzed. If there is data for the next page, the control returns to step S1003 to repeat the above-described control.

In the example shown in FIG. 12, the library 505 renders three pages (1207 to 1209) of data for the dynamic overlay form 1205. With respect to the second and third pages, since the value set in the field 1203 is "chemical A" which is the same value as the previous page, a dynamic overlay form is not created in step S1005. In other words, the second and third pages are rendered on the dynamic overlay form 1205 which has been created in the processing of the first page.

In the processing of the fourth page, the value set in the field 1203 changes from "chemical A" to "chemical B." Therefore, it is determined that the values are different in step S1004, and in step S1005 a dynamic overlay form 1301 is created and registered as shown in FIG. 13.

In this stage, the dynamic overlay form 1205 is discarded, and the form used in overlay printing is changed to the dynamic overlay form 1301. Thereafter in step S1006, the library 505 renders the two pages of data, the fourth page 1302 and the fifth page 1303. Then, the dynamic overlay forms 1205 and 1301, as well as pages 1207 to 1209, 1302, and 1303 are processed by the printer driver 901 and transmitted to the printer 911, and the final printout 1304 is obtained.

As described above, the form for overlay printing having inserted data is dynamically created and registered while print pages are rendered. By virtue of this control, the amount of data transmitted to the printer can be reduced.

Note that although the present embodiment has described the control as the processing performed by the library of the form creation application, it is also possible to have a printer driver execute the control.

[Modified Embodiment]

In the aforementioned method, a dynamic overlay form is always created in a case where the value set in the field is different from the value of the previous page; however, this is unnecessary in some cases. In view of this, described as a modified embodiment is a method of not creating a dynamic overlay form in a case where the value set in the field does not repetitively appear for plural pages.

Figure 14:
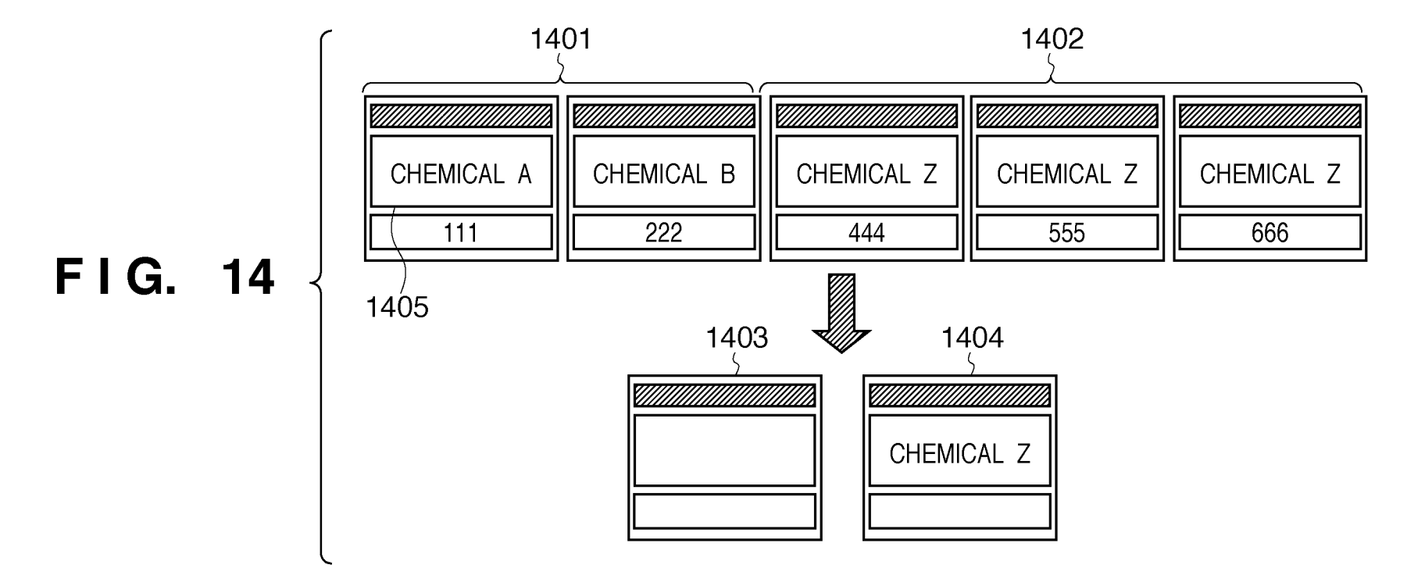
FIG. 14 is a view showing form creation according to a modified embodiment of the present invention.

FIG. 14 shows form creation according to a modification of the present embodiment. FIG. 14 shows an example of 5-page printouts. In the first and second pages 1401, data set in the field 1405 is not repetitive. Meanwhile, in the third to fifth pages 1402, a repetitive value "chemical Z" is set. In this case, even if a dynamic overlay form is created for the first and second pages, printing speed improvement cannot be expected. In other words, even if a dynamic overlay form is created and registered, the dynamic overlay form is used only for one page, and another dynamic overlay form is necessary for the next page.

In view of this, according to the modified embodiment, a dynamic overlay form is not created in a case where data does not repetitively appear for plural pages. More specifically, the inserted data file is read up to a number of pages ahead, and determination is made as to whether or not the data repetitively appears.

In the example shown in FIG. 14, a dynamic overlay form is not created in the first and second pages, and a normal form 1403 is registered in the printer.

Figure 15:
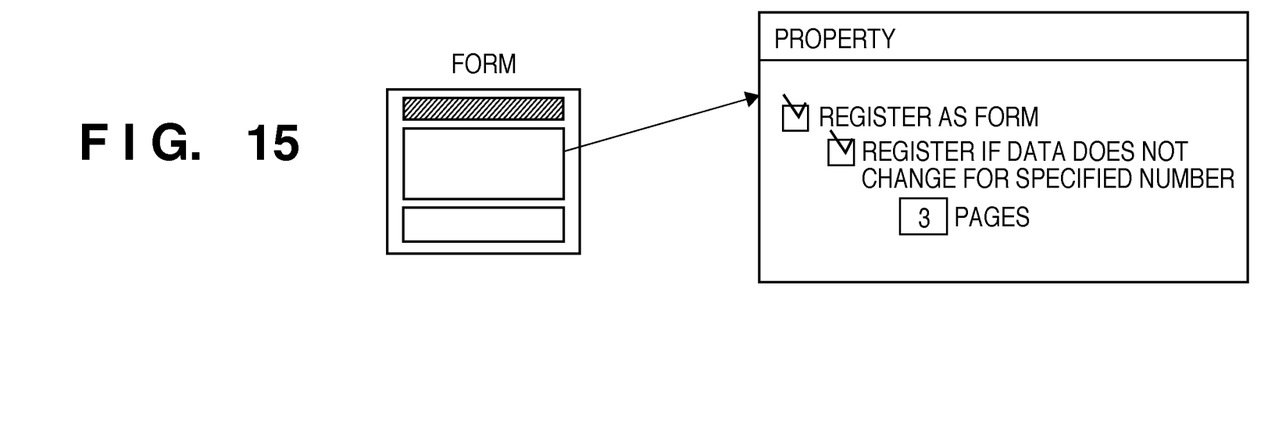
FIG. 15 is a view showing a property setting screen according to a modified embodiment of the present invention.

The number of pages to be read ahead may be determined in advance by the form creation application, or may be specified by a user through a property setting screen shown in FIG. 15.

FIG. 15 shows a property setting screen according to the modification of the present embodiment. In the example shown in FIG. 15, three pages are read ahead, and if the value does not change in three pages, a dynamic overlay form is created.

As has been described above, by using a larger amount of information as a target of overlay printing than that of normal overlay printing, printing performance can be improved.

[Other Embodiments]

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-318938, filed Dec. 15, 2008, which is hereby incorporated by reference herein in its entirety.

What is claimed is:

1. A form creation method in a print control apparatus, comprising:

displaying a form including a plurality of fields where data is inserted;

receiving a designation of a single field in the plurality of fields included in the form displayed in the displaying step;

creating an output form in which data of a first page has been inserted into the single field designated in the receiving step;

determining whether or not the data of the first page is the same as data of a second page following the first page; and using for the second page the output form created in the creating step, in which the data has been inserted in a case where the data of the first page is determined to be the same as the data of the second page, and controlling the creating step such that, in a case where data of the first page is determined to be different from data of the second page, an output form in which the different data of the second page has been inserted into the single field is newly created for the second page.

2. The method according to claim 1, further comprising determining whether or not the data is repetitive for a predetermined number of pages.

3. The method according to claim 2, further comprising setting the number of pages in the determining step.

4. The method according to claim 1, further comprising transmitting the output form created in the creating step to a printer which is connected to the print control apparatus.

5. A print control apparatus, comprising:

a display unit that displays a form including a plurality of fields where data is inserted;

a designation unit that receives a designation of a single field in the plurality of fields included in the form displayed by the display unit;

a creation unit that creates an output form in which data of a first page has been inserted into the single field designated by the designation unit;

a determination unit that determines whether the data of the first page is the same as or different from data of a second page following the first page; and a control unit that uses for the second page the output form created by the creation unit, in which the data has been inserted in a case where the determination unit determines that the data of the first page is the same as the data of the second page, and that controls the creation unit such that, in a case where the determination unit determines that the data of the first page is different from data of the second page, an output form in which the different data of the second page has been inserted into the single field is newly created for the second page.

6. The apparatus according to claim 5, further comprising a determination unit determines whether or not the data is repetitive for a predetermined number of pages.

7. The apparatus according to claim 6, further comprising a setting unit that sets the number of pages in the determination unit.

8. The apparatus according to claim 5, further comprising a transmission unit that transmits the output form created by the creation unit to a printer which is connected to the print control apparatus.

9. A non-transitory computer-readable storage medium storing program which causes a computer to execute the form creation method described in claim 1.

* * * * *